March 30, 1943.  R. F. THORNTON  2,315,299
AXLE COMPENSATOR
Filed Aug. 22, 1941  3 Sheets-Sheet 1

INVENTOR
Ray F. Thornton.
BY Gray and Smith
ATTORNEYS.

March 30, 1943.  R. F. THORNTON  2,315,299
AXLE COMPENSATOR
Filed Aug. 22, 1941   3 Sheets-Sheet 2

INVENTOR
Ray F. Thornton.
BY Gray and Smith
ATTORNEYS.

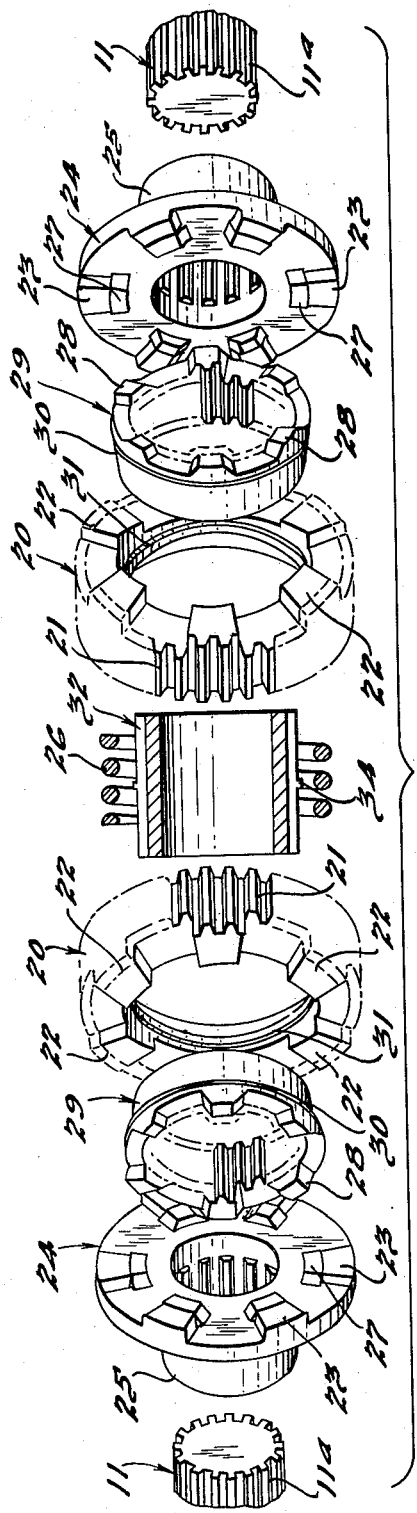
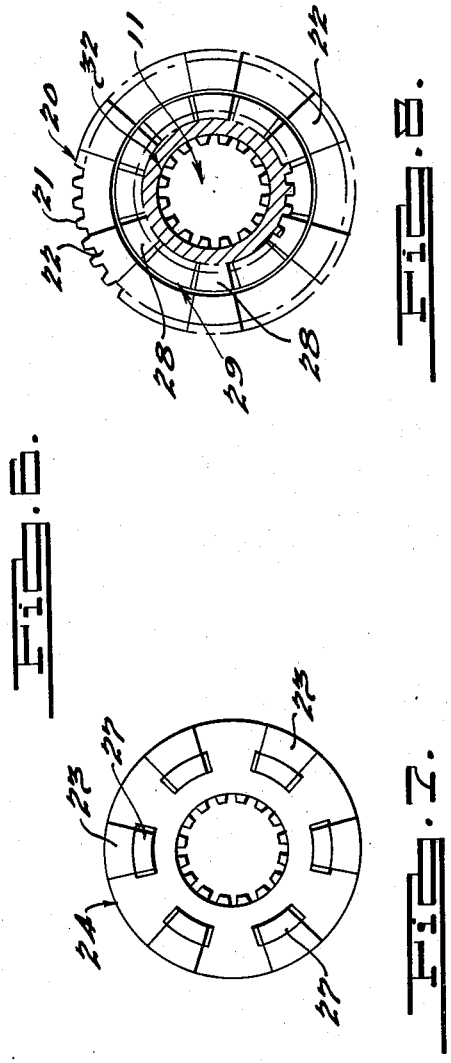

Patented Mar. 30, 1943

2,315,299

UNITED STATES PATENT OFFICE 2,315,299

AXLE COMPENSATOR

Ray F. Thornton, Dearborn, Mich., assignor to C. F. Gobright, Inc., Detroit, Mich., a corporation of Michigan Application August 22, 1941, Serial No. 407,921

7 Claims. (Cl. 74—389.5)

This invention relates to axle compensators and more particularly, although not exclusively, to an axle compensator adapted for use in structures such as land vehicles, particularly motor vehicles, instead of conventional differential devices.

It is commonly known that one of the most serious disadvantages of conventional differential devices is the possibility of spinning of one driving wheel with no driving torque delivered to the other driving wheel. This condition frequently causes stalling of motor vehicles as for example when one of the driving wheels is free to spin whenever its frictional engagement with the road surface is destroyed because of contact of the wheel with ice, sand or mud.

One of the objects of the present invention is to provide an axle compensator device for use in motor vehicles, which ensures transmission of driving torque to at least one wheel of a vehicle under all road conditions.

Still another object of the invention is to provide an improved compensator device for vehicles, which enables starting of a vehicle even if one of the driving wheels is not in sufficient frictional contact with the road surface to permit the other wheel to transmit a driving force to the vehicle. It is known that starting of vehicles equipped with conventional differential devices is impossible except when each driving wheel is able to deliver sufficient propelling force to the vehicle. This is not possible if one wheel is free to revolve without frictionally engaging the road to produce a vehicle propelling force.

A further object of the invention is to provide an anxle compensator in which means are provided whereby positive driving engagement of one of the half-axles with the ring gear is not affected by the disengagement of the other half axle therefrom. With axle compensators of the known types intended for similar use, disengagement of one half-axle affects adversely the operative engagement of the other half-axle, and this is very objectionable from the standpoint of safety and smooth operation.

Still another object of the invention is to provide an improved axle compensator which prevents dangerous spinning of either driving wheel such as may occur during high speed operation of a vehicle, as for example when a driving wheel runs off a hard surfaced road and contacts a soft shoulder of the highway.

A further object of the invention is to provide an axle compensator device which is constructed as an independent structure intended to take place of a conventional differential, instead of being a structure fitted into the housing of such a conventional differential, whereby a number of parts not necessary for successful operation of the axle compensator and which have been formerly provided therein in order to permit use of axle compensators of this general type in a conventional differential housing, are eliminated.

It is an added object of the present invention to provide an improved structure of the foregoing character, which is simple in construction, dependable under all practical conditions at which a motor vehicle may be operated, and which is relatively inexpensive to manufacture and service.

Other objects of this invention will appear in the following description and appended claims, reference being had to the accompanying drawings forming a part of this specification wherein like reference characters designate corresponding parts in the several views.

Fig. 6 is an exploded view showing the parts of the axle compensator in perspective with the center member and the spring being shown in section.

Fig. 7 is an end view of one of the clutch disengaging members, looking on the teeth end thereof.

Fig. 8 is an end view, partly in section, taken in the direction of the arrows from the plane 8—8 of Fig. 5.

Figure 1:
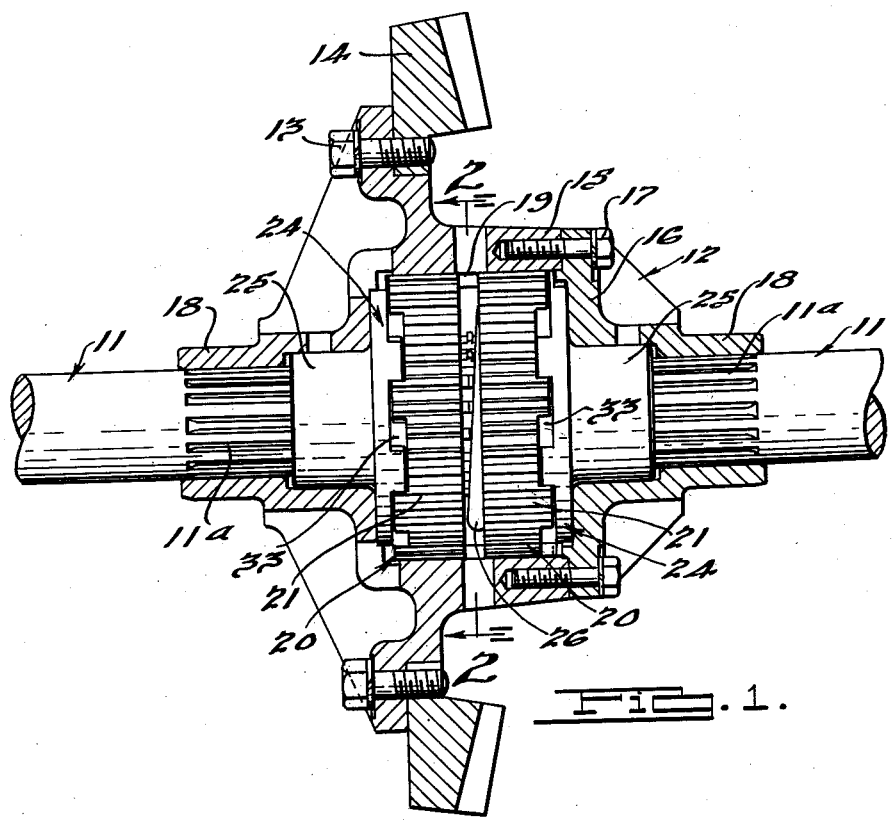
Fig. 1 is a view partly in section of the axle compensator embodying the present invention and showing the ring gear secured to the compensator housing.
Figure 2:
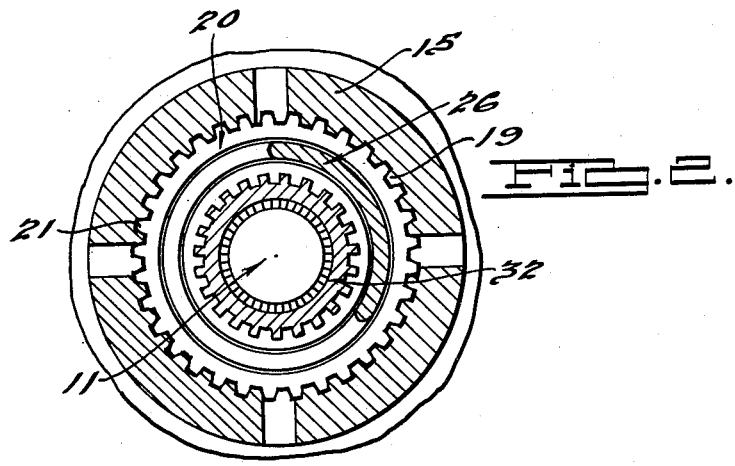
Fig. 2 is a sectional view taken in the direction of the arrows on the vertical transverse plane passing through the line 2—2 of Fig. 1.
Figure 3:
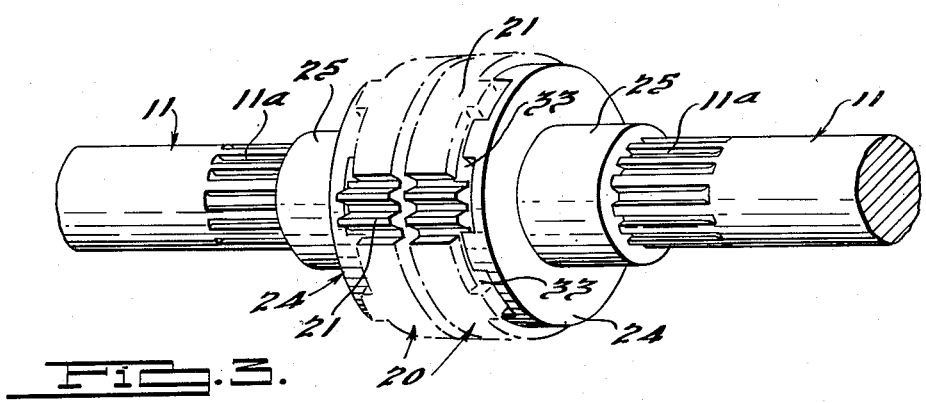
Fig. 3 is a perspective view of the axle compensator embodying the present invention and shown connecting two half axles or shafts, with the casing being removed.
Figure 4:
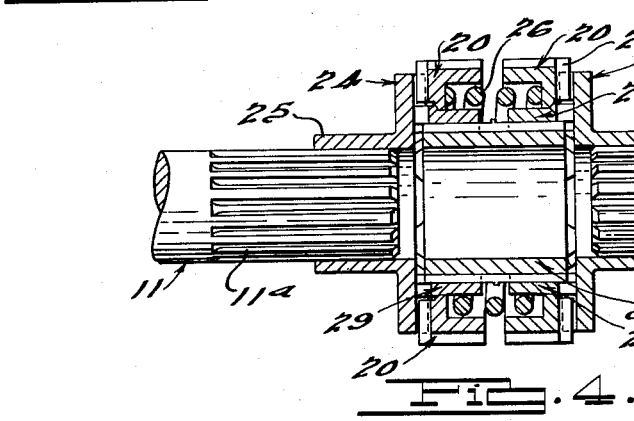
Fig. 4 is a longitudinal sectional view of the structure shown in Fig. 3 with both clutches being shown engaged.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown by way of example an axle compensator embodying the present invention and intended to be used in a motor vehicle in place of a conventional differential. It will be understood, however, that my compensator device may also be used in combination with structures other than motor vehicles, and in general it may be used in combination with any structure having two opposed shafts driven from a single source, either of said shafts being required to run ahead of the other shaft at certain times.

The compensator device embodying the present invention comprises generally first, two clutches preferably of the jaw type driven from a single source, each of said clutches being drivingly connected to the end of one of the opposed shafts; and second, means actuated by the respective axle with the aid of which the clutch connected with an overrunning axle is disengaged from the source of power, thereby permitting said axle to run freely ahead of the other axle. The construction of the operative parts of my improved compensator device is such that disengagement of one of the clutches produces a positive locking of the other clutch in the engaged position, thus ensuring transmission of the driving torque through said engaged clutch, and preventing simultaneous disconnection of both clutches.

Fig. 1 illustrates an axle compensator constructed in accordance with one embodiment of the present invention. The axle compensator illustrated in the drawings is symmetrical on both sides of a plane passing through its center and therefore for the sake of simplicity the same numerals will be assigned in the following description to the similar parts of the compensator if two of them are provided in the compensator, one on each side of said plane. Whenever it becomes necessary to distinguish between said similar parts as to the mode of their operation, they will hereinafter be distinguished by reference to the right hand or the left hand side of the compensator considering the transverse plane passing through the center of the device as a division plane.

Referring to the drawings and particularly to Fig. 1 thereof, the compensator device illustrated therein connects two opposed shafts or half axles 11. The device comprises a housing 12 to which there is connected in any suitable manner such as with the aid of screws 13 a ring gear 14 driven from a source of power, such as a vehicle engine, with the aid of a final drive pinion (not shown). The housing 12 is separable and it comprises a main portion 15 and a cap 16 connected to said main portion in any suitable manner such as with the aid of a plurality of screws 17. The portion 15 and the cap 16 are provided with sleeve extensions 18 in which there are journalled the splined ends 11a of the shafts 11.

The main portion 15 of the housing 12 is internally splined as shown at 19. Within the said splined portion 19 there are provided two slidable driving clutch members generally indicated by the numerals 20, which are externally splined as shown at 21. By virtue of such a construction the driving clutch members 20 are drivingly connected to the housing 12 and consequently the ring gear 14 and yet they are permitted to slide within said housing longitudinally thereof within predetermined limits. The driving clutch members 20 are provided on their end faces with a plurality of driving clutch teeth 22 engaging a corresponding plurality of similar teeth 23 provided on the clutch driven members 24 having sleeve-like extensions 25 which are internally splined for drivingly engaging the ends 11a of the shafts 11. A coil compression spring 26 is operatively arranged in the device as illustrated in the drawings and is adapted to push the clutch driving members 20 outwardly, thereby ensuring engagement of teeth 22 and 23 of the above described clutches. By virtue of such a construction there is provided a positive driving connection between the ring gear 14 and the half axles 11 carrying on their outer ends driving wheels (not shown).

When the ring gear 14 is rotated, it operates to drive the housing 12 and consequently the clutch driving members 20. It should be noted at this point that there is no direct driving connection between the housing 12 and the splined ends 11a of the shafts 11, and therefore said shafts 11 may rotate independently of said housing. From the driving clutch members 20 the driving torque is transmitted to the clutch driven members 24 and therefrom to the shafts or half axles 11. The above positive driving connection between the ring gear 14 and the half axles 11 remains intact as long as the shafts 11 rotate at the same angular speed, which condition prevails when the vehicle travels along a straight path either forward or backward.

In accordance with the invention there are provided in my compensator device improved means whereby either of the above described clutches is disengaged by the operation of the corresponding half axles 11 when the same begins to run ahead of the other half axle in either direction of rotation. Such condition prevails when the vehicle travels along a curved path and the outside wheel has to cover a longer distance than the inside wheel, in consequence whereof the outside half axle rotates at a higher angular speed than the half axle carrying the inside wheel. With the forward motion of the vehicle and power being transmitted from the engine to the driving wheels, this condition may be termed as one under which the respective clutch driven member tends to drive, said member being one connected to the shaft carrying the outside wheel.

In the present embodiment of the invention said means are exemplified by a plurality of slanted cam teeth 27 provided on the clutch driven member 24, which teeth mesh with similar cam teeth 28 provided on clutch disengaging members 29 made in the form of internally splined sleeves rotatably fitted in the clutch driving members 20 and having shoulders 30 bearing upon shoulders 31 provided on the driving clutch members 20. The clutch disengaging members 29 are drivingly connected to each other with the aid of a central member 32 which is in the form of an externally splined sleeve having the inside diameter slightly larger than the outside diameter of the splined ends 11a of the shafts 11.

Figure 5:
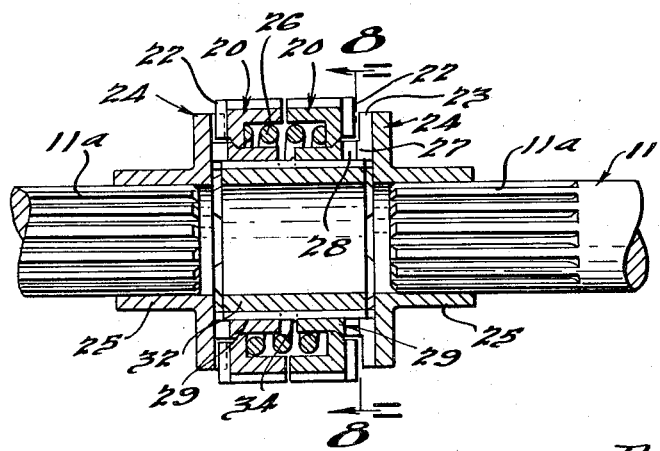
Fig. 5 is a view similar in part to Fig. 4, the right hand clutch thereof being shown disengaged.

When one of the shafts or half axles 11, the right hand shaft, for instance, begins to run ahead of the other shaft, the pressure of its cam teeth 27 on the teeth 28 of the right hand clutch disengaging member, which member continues to rotate at the speed of the other shaft because of the central member 32, produces a component force acting both on the clutch driven member 24 and the clutch disengaging member 29. Since the force tending to move the overrunning clutch driven member outwardly is opposed by the housing 12, the result of it is that the clutch disengaging member 29 moves inwardly of the compensator against the resistance of the spring 26, carrying with it the clutch disengaging member 20. This produces a slight relative rotation of the members 20 and 24 which is permitted by the backlash 33 between the clutch driving teeth 22 and clutch driven teeth 23. By the time said backlash is consumed because of the size of the slanted cam teeth 27 and 28, the clutch members 20 and 24 are fully disengaged. This condition is illustrated in Fig. 5 wherein the right hand clutch driving member 20 is shown pushed all the way in and consequently is disengaged. Thereafter overrunning of the right hand shaft 11 continues, the clutch teeth 22 and 23 sliding on their end faces until the clutch driven member rotates sufficiently far to cause its teeth to come in positions against the recesses of the clutch driving member, whereupon the clutch driving member is pushed by the spring 26 outwardly and into engagement with the clutch driving member. If, however, overrunning of the right hand shaft 11 continues, the cam teeth 27 and 28 again cause disengagement of the clutch driving member and overrunning rotation of the clutch driven member 24 and the shaft 11 one tooth further. This process is repeated, the clutch driven member "clicking" from tooth to tooth of the clutch driving member as long as the overrunning condition continues to exist.

The operation of the parts of the compensator device in disengaging the left hand clutch for permitting overrunning of the left hand shaft 11 is similar to the above described operation for disengaging the right hand shaft. It should also be noted that in the reverse operation of the vehicle the operation of the compensator device is also the same, the only difference being in the fact that the backlash 33 between the clutch teeth 22 and 23 will occur (in straight travelling of the vehicle) on the opposite respective sides of said teeth.

It is an important advantage of the above described construction that removal of the shafts 11 does not affect the central member 32 and the same remains in place, floatingly retained therein by the clutch driven members 24. I have found that should a central member be made of the same or of smaller outside diameter than that of the shafts 11, withdrawal of a shaft causes falling out of the central member and often the loss thereof.

A shoulder 34 is provided on the central member 32 in the middle thereof, and it serves as an abutment for clutch disengaging members 29 in the inward movement thereof. It should be noted that when a respective clutch disengaging member contacts said shoulder 34, a corresponding clutch driven member 20 substantially reaches the other clutch driven member, then in full engagement, and prevents said engaged clutch driven member from moving inwardly. By virtue of such a construction simultaneous disengagement of both clutches, highly objectionable under operation conditions, is prevented.

I claim:

1. In an axle compensator for a vehicle having two opposed axle shafts, a final drive gear and a housing secured thereto, two driving clutch members longitudinally slidable within said housing and drivingly connected directly thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth on the clutch driven members, two clutch disengaging members splined on a central member for maintaining said members in a predetermined position while permitting relative sliding movement of said members thereon, a stop on said central member located between the adjacent ends of said clutch disengaging members to limit sliding movements thereof, each of said clutch disengaging members bearing against one of said driving clutch members, and having a plurality of cam teeth adapted to mesh with the cam teeth of the driven clutch members, each of said clutch disengaging members being adapted to be pushed inwardly of the compensator by the interaction of said meshing cam teeth to the extent permitted by the stop on said central member when the respective clutch driven member tends to drive through said cam teeth, whereby only the corresponding driving clutch member is pushed away from such tending-to-drive clutch driven member at one time, thereby preventing simultaneous disengagement of said clutches.

2. In an axle compensator for a vehicle having two opposed axle shafts, a final drive gear and a housing secured thereto, two driving clutch members longitudinally slidable within said housing and drivingly connected directly thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth on the clutch driven members, two clutch disengaging members each bearing against one of said driving clutch members, a corresponding plurality of cam teeth on said clutch disengaging members adapted to mesh with the cam teeth of the driven clutch members, each of said clutch disengaging members being adapted to be pushed separately inwards of the compensator by the interaction of said meshing cam teeth when the respective clutch driven member tends to drive through said cam teeth, whereby the corresponding driving clutch member is pushed away from such tending-to-drive clutch driven member, said clutch disengaging members being internally splined, and an externally splined central member drivingly connecting said clutch disengaging members, said last members being adapted to slide on said central member, and stop means on said central member limiting the inward movements of said clutch disengaging members to predetermined limit.

3. In an axle compensator for a vehicle having two opposed axle shafts, a final drive gear and a housing secured thereto, two driving clutch members longitudinally slidable within said housing and drivingly connected directly thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth on the clutch driven members, two clutch disengaging members each bearing against one of said driving clutch members, a corresponding plurality of cam teeth on said clutch disengaging members adapted to mesh with the cam teeth of the driven clutch members, each of said clutch disengaging members being adapted to be pushed separately inwards of the compensator by the interaction of said meshing cam teeth when the respective clutch driven member tends to drive through said cam teeth, whereby the corresponding driving clutch member is pushed away from such tending-to-drive clutch member, said clutch disengaging members being internally splined, and an externally splined central member drivingly connecting said clutch disengaging members, said last members being adapted to slide on said central member, and a circular shoulder formed at the middle of said clutch disengaging member serving as an abutment for said clutch disengaging member in the inward position thereof.

4. In an axle compensator for a vehicle having two opposed axle shafts, a final drive gear and a housing secured thereto, two driving clutch members longitudinally slidable within said housing and drivingly connected directly thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth on the clutch driven members, two clutch disengaging members each bearing against one of said driving clutch members, a corresponding plurality of cam teeth on said clutch disengaging members adapted to mesh with the cam teeth of the driven clutch members, each of said clutch disengaging members being adapted to be pushed separately inwards of the compensator by the interaction of said meshing cam teeth when the respective clutch driven member tends to drive through said cam teeth, whereby the corresponding driving clutch member is pushed away from such tending-to-drive clutch driven member, said clutch disengaging members being internally splined, and an externally splined central member drivingly connecting said clutch disengaging members at said splining thereof, said last members being adapted to slide on said central member, and stop means on said central member limiting the inward movements of said clutch disengaging members to predetermined limit, said central member being adapted to be retained between said clutch driven members.

5. In an axle compensator for a vehicle having two opposed axle shafts, a final drive gear and a housing secured thereto, two driving clutch members longitudinally slidable within said housing and drivingly connected directly thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth on the clutch driven members, two clutch disengaging members each bearing against one of said driving clutch members, a corresponding plurality of cam teeth on said clutch disengaging members adapted to mesh with the cam teeth of the driven clutch members, each of said clutch disengaging members being adapted to be pushed separately inwards of the compensator by the interaction of said meshing cam teeth when the respective clutch driven member tends to drive through said cam teeth, whereby the corresponding driving clutch member is pushed away from such tending-to-drive clutch driven member, said clutch disengaging members being internally splined, and an externally splined central member drivingly connecting said clutch disengaging members, said last members being adapted to slide on said central member, and stop means on said central member limiting the inward movements of said clutch disengaging members to predetermined limit, said central member being in the form of a sleeve having inside diameter larger than the outside diameters of the ends of said shafts.

6. In an axle compensator for a vehicle having two opposed axle shafts, a final drive gear and a housing secured thereto, two driving clutch members longitudinally slidable within said housing and drivingly connected directly thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth on the clutch driven members, two clutch disengaging members each bearing against one of said driving clutch members, a corresponding plurality of cam teeth on said clutch disengaging members adapted to mesh with the cam teeth of the driven clutch members, each of said clutch disengaging members being adapted to be pushed separately inwards of the compensator by the interaction of said meshing cam teeth when the respective clutch driven member tends to drive through said cam teeth, whereby the corresponding driving clutch member is pushed away from such tending-to-drive clutch driven member, said clutch disengaging members being internally splined, and an externally splined central member drivingly connecting said clutch disengaging members, said last members being adapted to slide on said central member, and stop means on said central member limiting the inward movements of said clutch disengaging members to predetermined limit, said central member being in the form of a sleeve floatingly retained between said clutch driven members and having its inside diameter larger than the outside diameters of said axle shafts.

7. In a compensator for connecting two opposed shafts capable of overrunning each other, two clutches each having a driving member and a driven member, cam means operated by the overrunning shaft and operating to disengage said clutches, means for connecting said driving clutch members with a source of power independently of said cam means, said driving clutch members being adapted to move toward the center of the compensator for disengagement of the clutches, a centrally disposed spool located within the hubs of said driving clutch members and having a longitudinally splined connection therewith, a stop formed circumferentially on said spool and located between the adjacent ends of said driving clutch members to limit the extent of permitted relative sliding movement thereof and thus to prevent simultaneous disengagement of both of said clutch members.

RAY F. THORNTON.